US009558396B2

(12) United States Patent
Feng et al.

(10) Patent No.: US 9,558,396 B2
(45) Date of Patent: Jan. 31, 2017

(54) APPARATUSES AND METHODS FOR FACE TRACKING BASED ON CALCULATED OCCLUSION PROBABILITIES

(71) Applicant: Samsung Electronics Co., Ltd., Suwon-Si, Gyeonggi-Do (KR)

(72) Inventors: Xuetao Feng, Beijing (CN); Xiaolu Shen, Beijing (CN); Hui Zhang, Beijing (CN); Ji Yeun Kim, Seoul (KR); Jung Bae Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 98 days.

(21) Appl. No.: 14/514,877

(22) Filed: Oct. 15, 2014

(65) Prior Publication Data

US 2015/0110349 A1 Apr. 23, 2015

(30) Foreign Application Priority Data

Oct. 22, 2013 (CN) .......................... 2013 1 0499586
Jul. 23, 2014 (KR) ...................... 10-2014-0093315
Sep. 5, 2014 (KR) ........................ 10-2014-0118874

(51) Int. Cl.
*G06K 9/00* (2006.01)
(52) U.S. Cl.
CPC ................................ *G06K 9/00234* (2013.01)
(58) Field of Classification Search
None
See application file for complete search history.

(56) References Cited

U.S. PATENT DOCUMENTS

| 6,674,877 | B1 * | 1/2004 | Jojic ................. G06K 9/00369 |
| | | | 348/169 |
| 7,043,056 | B2 * | 5/2006 | Edwards ............ G06K 9/00248 |
| | | | 382/103 |
| 7,321,670 | B2 | 1/2008 | Yoon et al. |
| 7,499,574 | B1 | 3/2009 | Yang et al. |
| 7,783,083 | B2 | 8/2010 | Sung et al. |
| 8,073,287 | B1 | 12/2011 | Wechsler et al. |
| 8,503,720 | B2 * | 8/2013 | Shotton .............. G06K 9/00335 |
| | | | 382/103 |

(Continued)

FOREIGN PATENT DOCUMENTS

JP 1996-083341 A 3/1996
JP 2010-147950 A 7/2010

(Continued)

OTHER PUBLICATIONS

J. Lee, "Active Fusion Model with Robustness against Partial Occlusions", 2006, 12pgs.

*Primary Examiner* — Tahmina Ansari
(74) *Attorney, Agent, or Firm* — Harness, Dickey & Pierce, P.L.C.

(57) ABSTRACT

A face tracking apparatus includes: a face region detector; a segmentation unit; an occlusion probability calculator; and a tracking unit. The face region detector is configured to detect a face region based on an input image. The segmentation unit is configured to segment the face region into a plurality of sub-regions. The occlusion probability calculator configured to calculate occlusion probabilities for the plurality of sub-regions. The tracking unit is configured to track a face included in the input image based on the occlusion probabilities.

30 Claims, 20 Drawing Sheets

(56) References Cited

U.S. PATENT DOCUMENTS

| | | | | |
|---|---|---|---|---|
| 9,002,099 | B2* | 4/2015 | Litvak | G06K 9/00382 |
| | | | | 345/653 |
| 9,165,199 | B2* | 10/2015 | Zhu | G06K 9/00201 |
| 2007/0003141 | A1* | 1/2007 | Rittscher | G06K 9/00778 |
| | | | | 382/181 |
| 2008/0247609 | A1 | 10/2008 | Feris et al. | |
| 2009/0252423 | A1* | 10/2009 | Zhu | G06K 9/00201 |
| | | | | 382/209 |
| 2009/0262977 | A1* | 10/2009 | Huang | G06T 7/20 |
| | | | | 382/103 |
| 2010/0214289 | A1 | 8/2010 | Xiao et al. | |
| 2011/0052013 | A1 | 3/2011 | Sasahara et al. | |
| 2011/0064302 | A1 | 3/2011 | Ma et al. | |
| 2011/0081053 | A1 | 4/2011 | Zheng et al. | |
| 2012/0169887 | A1 | 7/2012 | Zhu et al. | |
| 2012/0189164 | A1 | 7/2012 | Feris et al. | |
| 2013/0236089 | A1* | 9/2013 | Litvak | G06K 9/00382 |
| | | | | 382/154 |
| 2015/0110349 | A1* | 4/2015 | Feng | G06K 9/00234 |
| | | | | 382/103 |
| 2015/0154456 | A1* | 6/2015 | Pau | G06K 9/4671 |
| | | | | 382/201 |

FOREIGN PATENT DOCUMENTS

| | | | |
|---|---|---|---|
| KR | 2006-0055064 A | | 5/2006 |
| KR | 2007-0117829 A | | 12/2007 |
| WO | WO 2014009490 | * | 1/2014 |

* cited by examiner

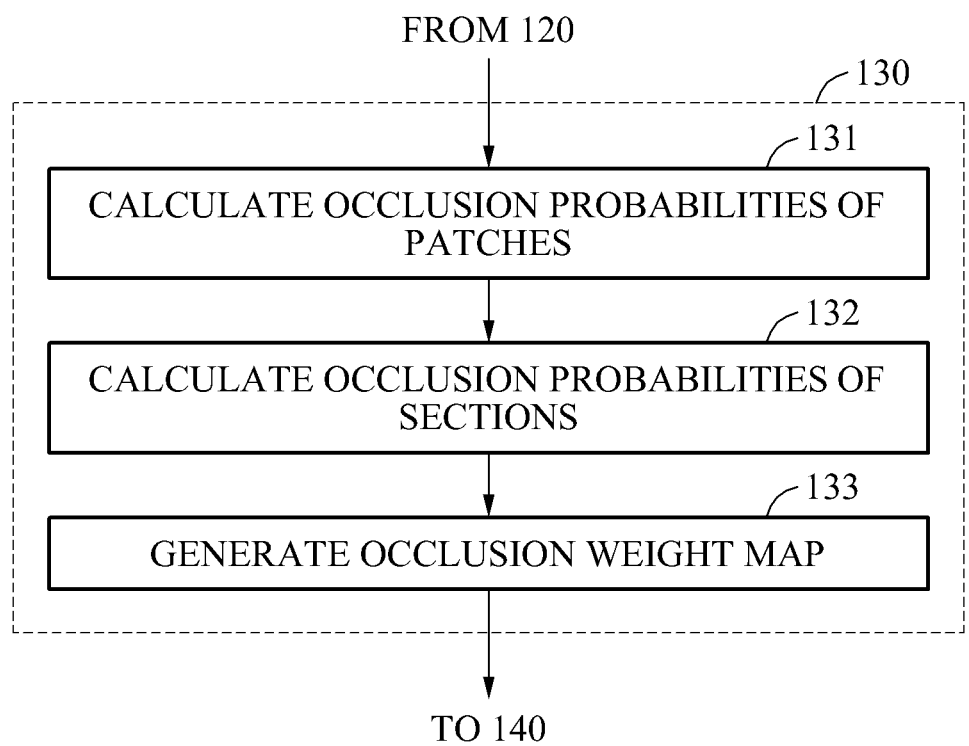

APPARATUSES AND METHODS FOR FACE TRACKING BASED ON CALCULATED OCCLUSION PROBABILITIES

CROSS-REFERENCE TO RELATED APPLICATION(S)

This application claims priority under 35 U.S.C. §119 to Chinese Patent Application No. 201310499586.6, filed on Oct. 22, 2013, in the State Intellectual Property Office of China, to Korean Patent Application No. 10-2014-0093315, filed on Jul. 23, 2014, in the Korean Intellectual Property Office, and to Korean Patent Application No. 10-2014-0118874, filed on Sep. 5, 2014, in the Korean Intellectual Property Office, the entire contents of each of which are incorporated herein by reference.

BACKGROUND

Field

One or more example embodiments of the following description relate to face tracking apparatuses and/or methods, and more particularly, to apparatuses and/or methods for tracking a face and a key point of the face.

Description of the Related Art

A face is effectively identified by main components, for example eyes, a nose, or a mouth. Face tracking may be performed using feature points corresponding to these main components. However, if the face is partially occluded, then accurately tracking the face may be more difficult. For example, when a user wears sunglasses, it may be more difficult to accurately track feature points corresponding to eyes. When a user wears a mask, it may be more difficult to accurately track feature points corresponding to a mouth. When a shadow appears over a face due to an uneven luminous environment, size and shape of a region of the face occluded by the shadow may be changed based on an expression of the face, and it may be more difficult to accurately track the face.

SUMMARY

At least one example embodiment provides a face tracking method including: detecting a face region based on an input image; segmenting the face region into a plurality of sub-regions; calculating occlusion probabilities for the plurality of sub-regions; and tracking a face included in the input image based on the occlusion probabilities. At least a portion of the face in the input image may be occluded.

At least one other example embodiment provides a non-transitory computer readable recording medium storing a program that, when executed on a computer, causes the computer to implement a face tracking method. According to at least this example embodiment, the method includes: detecting a face region based on an input image; segmenting the face region into a plurality of sub-regions; calculating occlusion probabilities for the plurality of sub-regions; and tracking a face included in the input image based on the occlusion probabilities. At least a portion of the face in the input image may be occluded.

At least one other example embodiment provides a face tracking apparatus including: a face region detector configured to detect a face region based on an input image; a segmentation unit configured to segment the face region into a plurality of sub-regions; an occlusion probability calculator configured to calculate occlusion probabilities of the plurality of sub-regions; and a tracking unit configured to track a face included in the input image based on the occlusion probabilities.

The detecting may include: extracting a plurality of first feature points from a current frame of the input image; selecting at least one key frame from a database; estimating a pose of the face based on the plurality of first feature points and a plurality of second feature points of the at least one key frame; and estimating a plurality of third feature points of the face based on the estimated pose.

The estimating of the pose may include: generating matching relationship information associated with a matching relationship between the plurality of first feature points and the plurality of second feature points based on a similarity between feature vectors of the plurality of first feature points and feature vectors of the plurality of second feature points; and estimating a pose parameter based on a distance between coordinates of a first feature point and projected coordinates of a second feature point matched to the first feature point. The pose parameter is indicative of the pose of the face.

The segmenting may include: generating a plurality of patches based on positions and colors of pixels included in the face region; and generating a plurality of sections based on feature points estimated from the face region.

The calculating may include: calculating first occlusion probabilities of a plurality of patches based on first probability models for the plurality of patches; calculating second occlusion probabilities of a plurality of sections based on second probability models for the plurality of sections; and generating an occlusion weight map based on the first occlusion probabilities and the second occlusion probabilities.

The tracking may include adjusting a parameter of a face model representing the face using or based on an occlusion weight map.

The face tracking method may further include: evaluating a tracking result using a trained classifier; and updating a key frame when the tracking result is evaluated as successful.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 6 is a flowchart illustrating an operation of calculating occlusion probabilities in the face tracking method of FIG. 1;

DETAILED DESCRIPTION

Figure 1:
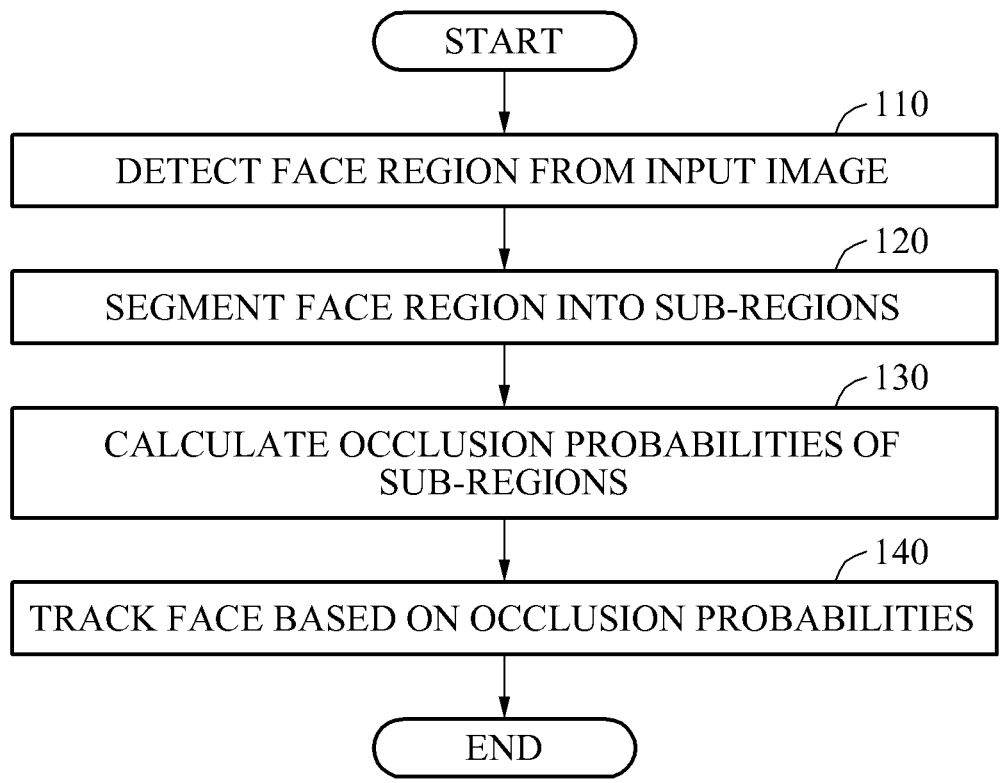
FIG. 1 is a flowchart illustrating a face tracking method according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

FIG. 1 is a flowchart illustrating a face tracking method according to example embodiments. A face model is described prior to description of the face tracking method of FIG. 1. The face model refers to a model representing a face included in an input image. The face model may include, for example, a two-dimensional (2D) shape model, a three-dimensional (3D) shape model, and/or a texture model. The face model may be, for example, a deformable shape model.

In the 2D shape model, a geometric position of each of feature points of a face may be represented by 2D coordinates. Feature points may refer to points located in a characteristic appearance of a face, for example, eyes, a nose, a mouth, eyebrows, a contour of the face, and the like. The 2D shape model may be represented, for example, by Equation 1 shown below.

$$s(p, q) = N\left(s_0 + \sum_i p_i s_i; q\right) \quad \text{[Equation 1]}$$

In Equation 1, s denotes a vector representing a 2D shape model, and may include 2D coordinates of feature points of a face. Additionally, p denotes a 2D shape parameter, and q denotes a 2D similarity transformation parameter. $s_0$ denotes a 2D average shape, and $s_i$ denotes a 2D shape primitive. $p_i$ denotes a component of the 2D shape parameter p, and N( ) denotes a function used to perform 2D similarity transformation on a 2D shape. Based on the 2D shape parameter p, different 2D face shapes may be generated. Based on the 2D similarity transformation parameter q, a pose of a 2D face may be changed. 2D coordinates of feature points forming the 2D shape model s may be determined by the 2D shape parameter p and the 2D similarity transformation parameter q.

In the 3D shape model, a geometric position of each of feature points of a face may be represented by 3D coordinates. The 3D shape model may be represented, for example, by Equation 2 shown below.

$$s'(p', q') = N'\left(s'_0 + \sum_i p'_i s'_i; q'\right) \quad \text{[Equation 2]}$$

In Equation 2, s' denotes a vector representing a 3D shape model, and may include 3D coordinates of feature points of a face. Additionally, p' denotes a 3D shape parameter, and q' denotes a 3D similarity transformation parameter. $s'_0$ denotes a 3D average shape, and $s'_i$ denotes a 3D shape primitive. $p'_i$ denotes a component of the 3D shape parameter p', and N'( ) denotes a function used to perform 3D similarity transformation on a 3D shape.

Based on the 3D shape parameter p', different 3D face shapes may be generated. Based on the 3D similarity transformation parameter q', a pose or position of a 3D face may be changed in a 3D coordinate system. The 3D shape parameter p' may correspond to an expression of a face. For example, the 3D shape parameter p' may include an expression of an individual as well as a face shape of an individual. Additionally, the 3D similarity transformation parameter q' may correspond to a pose of a face. 3D coordinates of feature points forming the 3D shape model s' may be determined by the 3D shape parameter p' and the 3D similarity transformation parameter q'.

The texture model may represent a texture of a face. The texture model may be represented, for example, by Equation 3 shown below. The texture model may be referred to as an "appearance model."

$$a(b) = a_0 + \sum_i b_i a_i \quad \text{[Equation 3]}$$

In Equation 3, a denotes a texture vector representing a texture model, and b denotes a texture parameter. Additionally, $a_0$ denotes an average texture, $a_i$ denotes a texture primitive, and $b_i$ denotes a component of the texture parameter b. Based on the texture parameter b, the texture model a may be deformed.

Referring to FIG. 1, the face tracking method may detect a face region from an input image in operation 110, may segment the face region into sub-regions in operation 120, may calculate occlusion probabilities of the sub-regions in operation 130, and may track a face based on the occlusion probabilities in operation 140. In an example, the face tracking method may be implemented by a software module and may be performed by a processor. In another example, the face tracking method may be implemented by a hardware module. In still another example, the face tracking method may be implemented by a combination of a software module and a hardware module. Hereinafter, the software module, the hardware module, or a combination thereof that is used to implement the face tracking method, may be referred to as a "face tracking apparatus."

A face tracking apparatus according to example embodiments may track a face from an input image. The input image may be, for example, a plurality of images, or a video stream. For example, the face tracking apparatus may track a face from each of the plurality of images, or from each of frames in the video stream.

Figure 2:
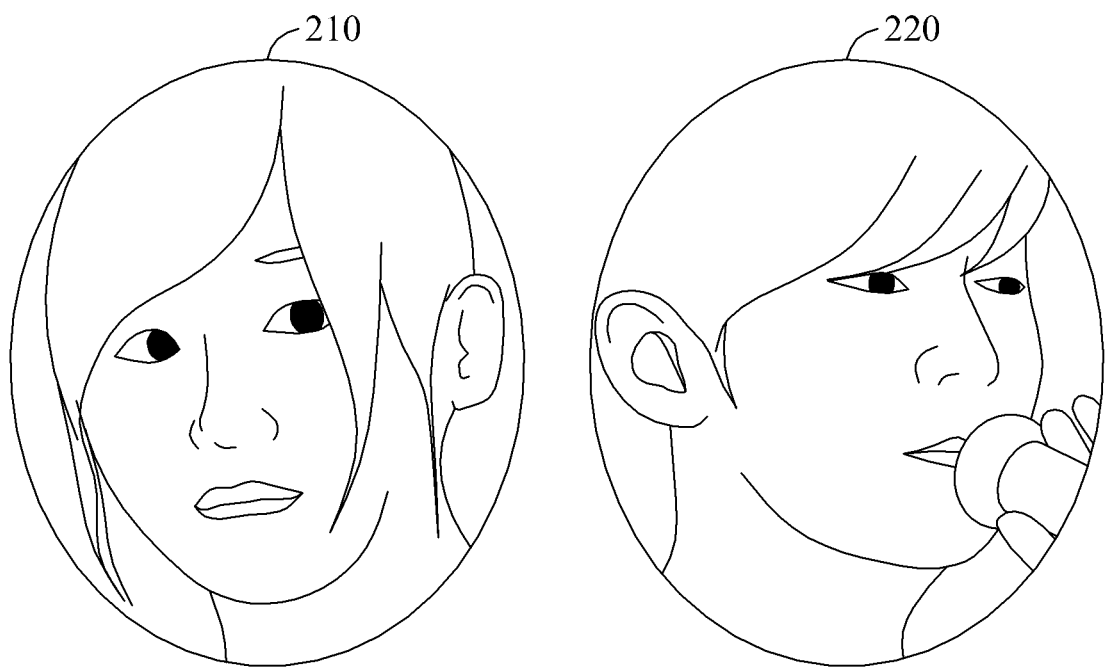
FIG. 2 illustrates an occlusion phenomenon according to example embodiments.

At least a portion of a face included in the input image may be occluded by an object. For example, referring to FIG. 2, in a first face image 210, a right eyebrow, a portion of a left eyebrow, and a portion of a left eye of a user face are occluded by hair. Additionally, in a second face image

220, a right eyebrow and a portion of a left eyebrow of a user face are occluded by hair, and a portion of lips is occluded by a microphone.

When at least a portion of a face in the input image is occluded by the object, an accuracy of a tracking result may be reduced. Example embodiments may provide a technology of deducing a tracking result with a high accuracy, despite at least a portion of a face in an input image being occluded by the object.

In operation 110, the face tracking apparatus may receive the input image, and may detect the face region from the input image. The face region may refer to a region of a single image or a single frame that includes a face. The face region may include main components of the face, for example eyes, a nose, a mouth, eyebrows, and the like, and a contour of the face. For example, a single image or a single frame may include a full human body. In this example, the face tracking apparatus may detect a face region corresponding to a face of the full human body.

The face tracking apparatus may detect a face region of a current frame, based on a previous tracking result for a previous frame. A movement speed of a face may be limited to a speed less than a predetermined speed and accordingly, the face tracking apparatus may determine the face region of the current frame by peripherally extending a region including a face in the previous frame.

Figure 3:
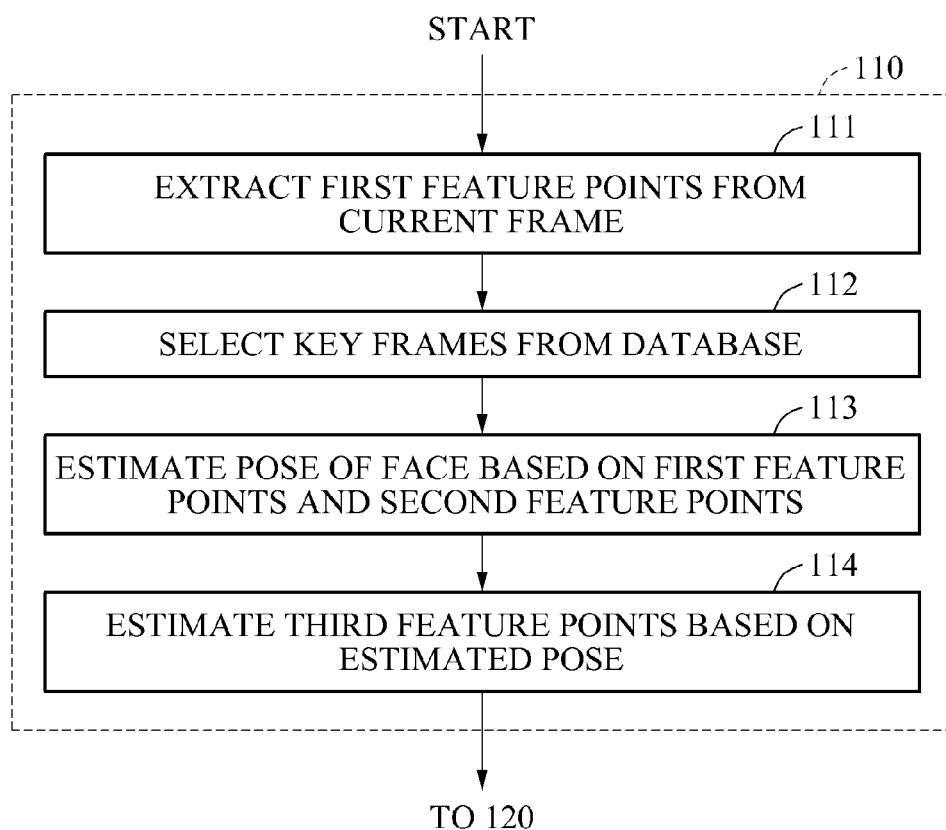
FIG. 3 is a flowchart illustrating an operation of detecting a face region in the face tracking method of FIG. 1.

Referring to FIG. 3, in operation 111, the face tracking apparatus may extract feature points from the current frame. The face tracking apparatus may extract, from the current frame, feature points representing eyes, a nose, a mouth, eyebrows, a contour of a face, and the like. For example, to detect feature points, the face tracking apparatus may use at least one of a scale-invariant feature transform (SIFT) algorithm, a speed up robust feature (SURF) algorithm, and a features from accelerated segment test (FAST) algorithm. Hereinafter, the feature points extracted from the current frame may be referred to as "first feature points."

In operation 111, feature points irrelevant to the face may be extracted from an occluded part. For example, a portion of the lips is occluded by the microphone in the second face image 220 of FIG. 2 and accordingly, a feature point corresponding to the microphone may be extracted, instead of a feature point corresponding to the lips.

In operation 112, the face tracking apparatus may select key frames from a database. The database may store a plurality of key frames. Each of the key frames may be indexed by at least one of a pose parameter and an expression parameter. For example, each of the key frames may store feature points corresponding to a combination of a predetermined pose and a predetermined expression. Each of the key frames may store feature points in the form of 3D coordinates.

The face tracking apparatus may select key frames associated with the previous tracking result from among the key frames stored in the database. For example, a pose parameter p1 and an expression parameter e1 may be obtained by tracking the previous frame. In this example, the face tracking apparatus may select a key frame indexed by (p1, e1) from among the key frames stored in the database. Additionally, the face tracking apparatus may select key frames indexed by (p1, *) or (*, e1) from among the key frames stored in the database. (p1, *) may indicate all indices including the pose parameter p1, and (*, e1) may indicate all indices including the expression parameter e1. In another example, the face tracking apparatus may determine indices similar to (p1, e1), and may select key frames indexed by the determined indices. The above key frame selection scheme is merely an example and accordingly, a key frame selection scheme may be variously changed.

In operation 113, the face tracking apparatus may estimate a pose of the face, based on the first feature points, and feature points included in each of the selected key frames. Each of the selected key frames may store feature points in the form of 3D coordinates. Hereinafter, the feature points included in each of the selected key frames may be referred to as "second feature points."

Pose estimation may be performed by two main operations. In a first operation of the pose estimation, the face tracking apparatus may generate matching relationship information on a matching relationship between the first feature points and the second feature points of each of the key frames. Each of the key frames may store previously successfully matched feature points in the form of 3D coordinates, and may further store feature vectors of the previously successfully matched feature points.

3D coordinates stored in each of the key frames may be obtained by projecting 2D coordinates of the previously successfully matched feature points to a 3D shape model. The 3D coordinates may be placed in a face of a triangle forming a 3D shape model. The 3D coordinates may be represented by coordinates of each of a vertex and an orthocenter of the triangle. The orthocenter of the triangle refers to a point at which three altitudes of the triangle drawn from three vertices of the triangle to their opposite edges, respectively, intersect.

A feature vector stored in a key frame may be calculated by a color of a region neighboring the previously successfully matched feature points. For example, the feature vector may be calculated based on a color histogram and/or a SIFT histogram. The feature vector may reflect a texture feature of the previously successfully matched feature points.

The face tracking apparatus may generate the matching relationship information based on whether feature vectors, that is, texture vectors are similar to each other. For example, the face tracking apparatus may compare feature vectors of the first feature points to feature vectors of the second feature points. The face tracking apparatus may match a first feature point and a second feature point that have similar feature vectors. The face tracking apparatus may calculate a distance between feature vectors. The face tracking apparatus may detect a second feature point having a feature vector located closest to a feature vector of a first feature point, among the second feature points. The face tracking apparatus may select the detected second feature point as a matching point of the first feature point.

The face tracking apparatus may select a single key frame from among the key frames selected from the database. For example, the face tracking apparatus may select a key frame including second feature points that are best matched to the first feature points. The matching relationship information may be generated by similarity between feature vectors, and key frames with the most similar texture information may be selected.

In a second operation of the pose estimation, the face tracking apparatus may estimate a pose of a face included in the current frame, based on the matching relationship information. For example, the face tracking apparatus may adjust a 3D similarity transformation parameter of an appropriate 3D shape model based on the matching relationship information. The face tracking apparatus may acquire a 3D face model corresponding to the selected key frames, and may determine the 3D similarity transformation parameter of the 3D face model based on the matching relationship information. The face tracking apparatus may estimate the pose of the face in the current frame, by determining the 3D similarity transformation parameter.

For example, the face tracking apparatus may change a pose and a 3D position of each of matching feature points in a key frame, by adjusting the 3D similarity transformation parameter. To compare the matching feature points in the key frame transformed by the 3D similarity transformation parameter to matching feature points in the current frame, the face tracking apparatus may project the matching feature points in the key frame to the current frame, because each of the matching feature points in the key frame has 3D coordinates, and the current frame is a 2D image. The face tracking apparatus may acquire projection points by projecting the matching feature points in the key frame to the current frame. The projection points and the matching feature points in the current frame may have 2D coordinates.

The face tracking apparatus may calculate a distance between the projection points and the matching feature points in the current frame. For example, the face tracking apparatus may calculate a distance between the projection points and the matching feature points in the current frame, using Equation 4 shown below.

$$\sum_i |\rho(v_i - Proj(N'(u_i; q')))|^2 \qquad \text{[Equation 4]}$$

In Equation 4, i denotes an index of a pair of points matched to each other, $v_i$ denotes a matching feature point of a current frame, and $u_i$ denotes a matching feature point of a key frame. Proj( ) denotes a function used to project a matching feature point of a key frame to a current frame, and N'( ) denotes a function used to perform similarity transformation (for example, 3D movement and rotation) on a 3D shape model. Additionally, q' denotes a 3D similarity transformation parameter.

p( ) denotes a robust error function. The robust error function may allow an output to be increased based on an input when the input is less than a threshold, and may cause a slowdown in a speed in which the output is increased or the output not to be increased when the input is greater than the threshold. By using the robust error function, the face tracking apparatus may reduce interference of an error occurring during matching of feature points in pose estimation.

The face tracking apparatus may determine the 3D similarity transformation parameter of the 3D face model, so that the distance between the projection points and the matching feature points in the current frame may have a minimum value. The face tracking apparatus may estimate the pose of the face in the current frame, by determining the 3D similarity transformation parameter.

In operation 114, the face tracking apparatus may estimate feature points of the face in the current frame based on the estimated pose. Hereinafter, the estimated feature points of the face may be referred to as "third feature points." Because the first feature points are extracted directly from the current frame, first feature points extracted from an occluded part may include feature points irrelevant to the face. The third feature points may be estimated based on a pose that is similar to the previous tracking result and that has a high correlation with the first feature points and accordingly, third feature points associated with the face may be estimated from the occluded part.

The face tracking apparatus may determine parameters of a 2D shape model for the current frame, based on a 3D shape model. The face tracking apparatus may estimate feature points of the 2D shape model as feature points of the face in the current frame.

For example, the face tracking apparatus may determine parameters of a 2D shape model to minimize a cost function represented by Equation 5 shown below.

$$|s(p,q) - Proj(s')|^2 \qquad \text{[Equation 5]}$$

The face tracking apparatus may minimize the cost function of Equation 5, using a gradient descent algorithm, to determine parameters p and q of the 2D shape model. In this example, feature points forming the 2D shape model may not respectively correspond to feature points forming the 3D shape model. The face tracking apparatus may minimize the cost function of Equation 5 only for feature points that correspond to each other.

The face tracking apparatus may detect a face region from the current frame, based on position coordinates corresponding to feature points of the 2D shape model for the current frame. The face tracking apparatus may detect the face region from the current frame, based on the previous tracking result.

Another face tracking apparatus according to example embodiments may detect a face region, using a typical face detection algorithm. For example, a first frame in a video stream, or an initially input image among a plurality of images may not include previous frame information. In this example, the face tracking apparatus may detect a face region, using the typical face detection algorithm.

The face tracking apparatus may store a valid matching result, although not illustrated in the drawings. The valid matching result may include information indicating whether matching between the first feature points and the second feature points is valid. For example, the valid matching result may include a pair of a first feature point and a second feature point that have a difference less than a predetermined threshold, among pairs of first feature points and second feature points that are matched based on the matching relationship information. The valid matching result may indicate feature points included in a non-occluded region.

The face tracking apparatus may generate a valid matching result, based on a distance between feature points extracted from the current frame and projection points projected to the current frame in the 3D shape model. For example, the face tracking apparatus may classify the feature points extracted from the current frame into a valid matching group and an invalid matching group. The face tracking apparatus may calculate a distance between the feature points extracted from the current frame and the projection points. When the calculated distance is less than a threshold, the face tracking apparatus may classify the feature points extracted from the current frame as the valid matching group. When the calculated distance is equal to or greater than the threshold, the face tracking apparatus may classify the feature points extracted from the current frame as the invalid matching group. The face tracking apparatus may generate a valid matching result based on the feature points classified as the valid matching group.

The valid matching result may be used for generation of sections during segmentation of the face region into sub-regions. A scheme of using the valid matching result will be further described below.

In operation 120, the face tracking apparatus may segment the face region into sub-regions. The sub-regions may be regions into which the face region is segmented, and may include patches and sections. The patches may be generated by clustering pixels in the face region based on positions and colors of the pixels. The sections may be generated by merging the patches based on feature points in the face region.

Figure 4:
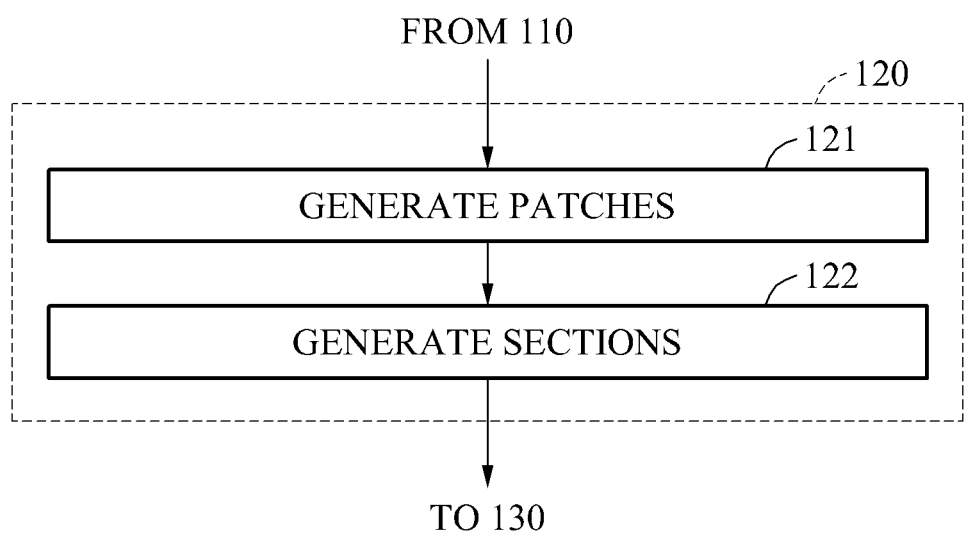
FIG. 4 is a flowchart illustrating an operation of segmenting the face region in the face tracking method of FIG. 1.
Figure 5A:
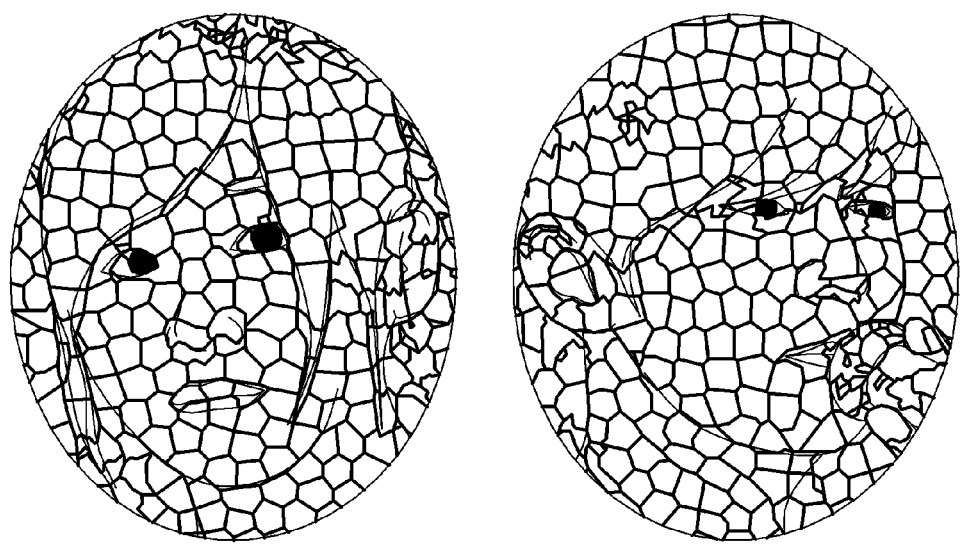
FIGS. 5A through 5C illustrate sub-regions according to example embodiments.

Referring to FIG. 4, the face tracking apparatus may generate patches in operation 121. The face tracking apparatus may cluster pixels having similar colors in similar positions, to generate patches. The face tracking apparatus may segment pixels having different colors in the face region as different patches. Accordingly, an occluded part and a non-occluded part in the face region may be segmented into different patches. For example, patches of FIG. 5A may be generated from the first face image 210 and the second face image 220 of FIG. 2.

For example, the face tracking apparatus may generate patches by iteratively applying a K-means clustering algorithm on pixels of a face image, using a position-color descriptor. The position-color descriptor may be represented, for example, by [x, y, r, g, b] in which x denotes an x-coordinate of a pixel, y denotes a y-coordinate of a pixel, r denotes a red component of a pixel, g denotes a green component of a pixel, and b denotes a blue component of a pixel.

In operation 122, the face tracking apparatus may generate sections. The face tracking apparatus may merge neighboring patches based on feature points in the face region, to generate sections. The feature points in the face region may be, for example, third feature points. The feature points in the face region may be located in main components of the face, for example eyes, a nose, a mouth, eyebrows, and the like and accordingly, the sections may correspond to the main components of the face, respectively. The sections may be different from each other in size. For example, a size of a section corresponding to an eye may be different from a size of a section corresponding to a nose. Additionally, a cheek part that does not show a feature of the face may be included in a single section.

Figure 5B:
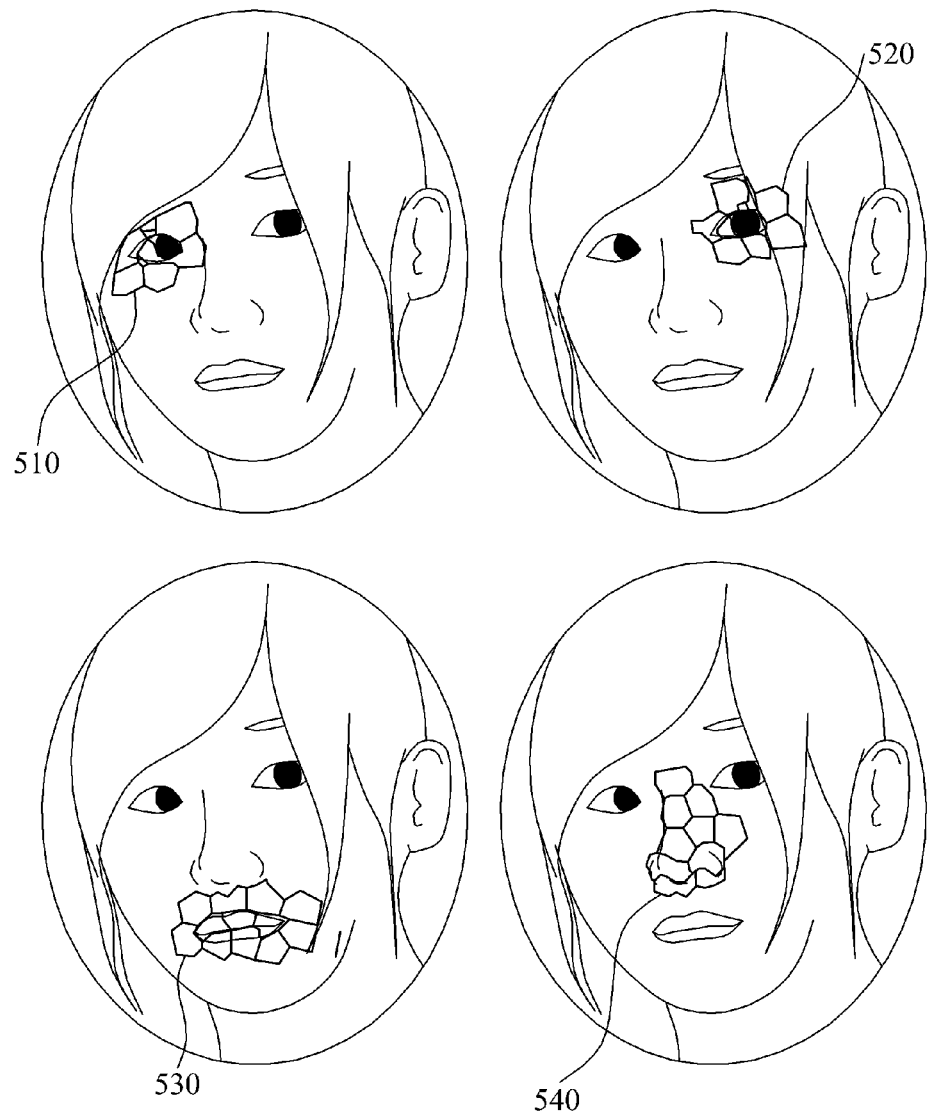

Referring to FIG. 5B, a first section 510 and a second section 520 may correspond to a right eye and a left eye in a first face image, respectively. Additionally, a third section 530 and a fourth section 540 may correspond to a mouth and a nose in the first face image, respectively.

Figure 5C:
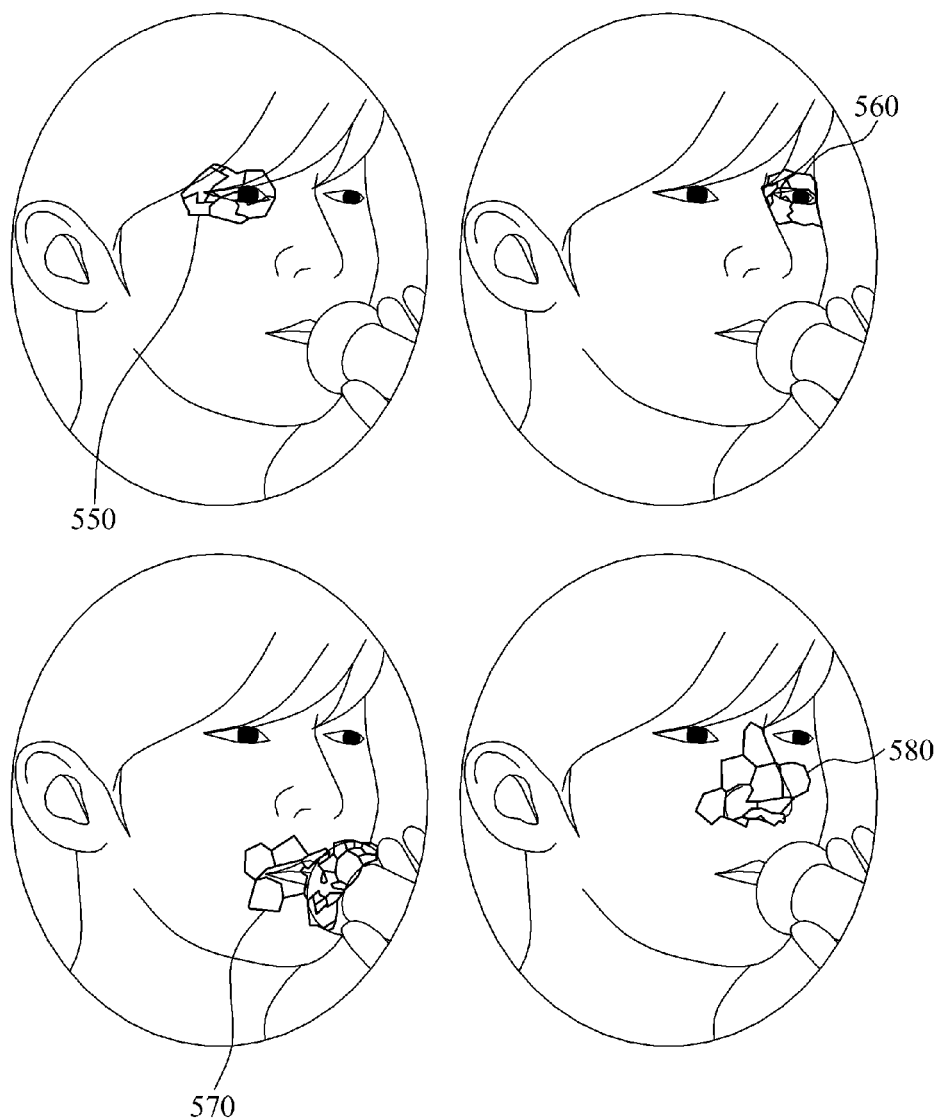

Referring to FIG. 5C, a fifth section 550 and a sixth section 560 may correspond to a right eye and a left eye in a second face image, respectively. Additionally, a seventh section 570 and an eighth section 580 may correspond to a mouth and a nose in the second face image, respectively.

In operation 130, the face tracking apparatus may calculate occlusion probabilities of the sub-regions. An occlusion probability of each of the sub-regions may refer to a probability that each of the sub-regions is occluded. A value of the occlusion probability may be equal to or greater than "0" and equal to or less than "1," and an exposure probability may be obtained by subtracting the occlusion probability from "1." An exposure probability of each of the sub-regions may refer to a probability that each of the sub-regions is exposed instead of being occluded. Hereinafter, for convenience of description, an example of using an occlusion probability is described, however, example embodiments may be modified to use an exposure probability.

Figure 7:
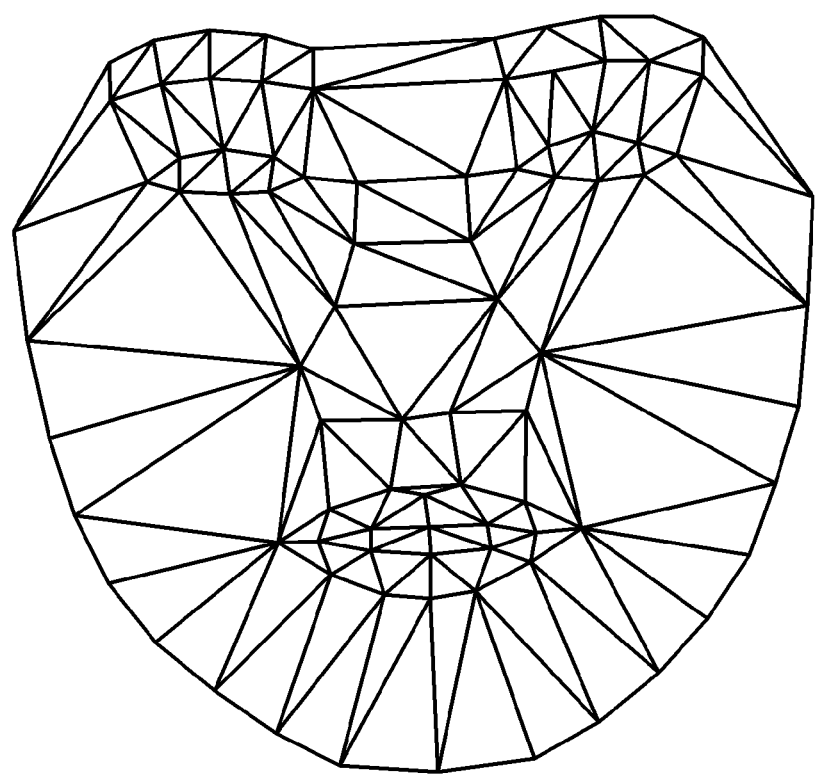
FIG. 7 illustrates a template shape according to example embodiments.

The face tracking apparatus may calculate the occlusion probabilities of the sub-regions, based on probability models. For example, referring to FIG. 6, in operation 131, the face tracking apparatus may calculate occlusion probabilities of the patches. The face tracking apparatus may calculate an occlusion probability of each of the patches, based on a probability model of a part of a template shape that corresponds to each of the patches. The template shape may be, for example, a predetermined face shape, and may include a plurality of parts forming the predetermined face shape, as shown in FIG. 7. A probability model may be designated for each of parts of the template shape.

Figure 8:
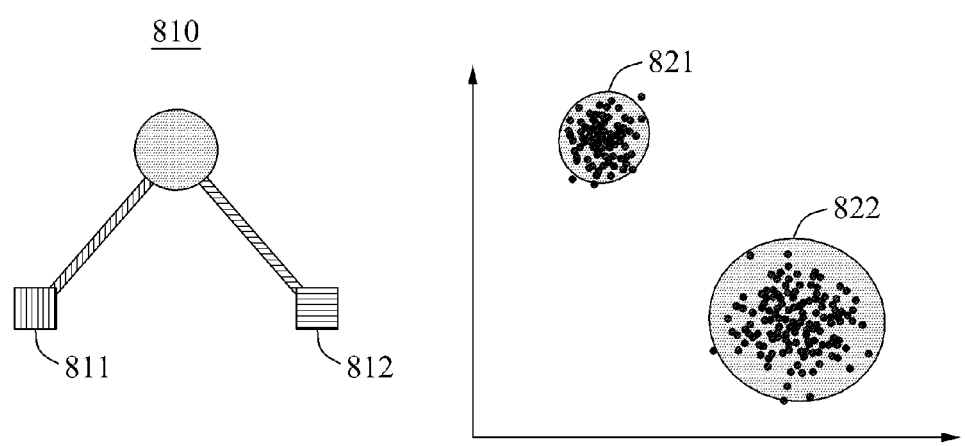
FIG. 8 illustrates a probability model according to example embodiments.

Probability models designated for parts of a template shape may be, for example, a random tree cluster-based adaptive multivariate Gaussian model. Referring to FIG. 8, a random tree 810 may be adapted to cluster patch data. Each of leaf nods of a random tree may cluster patch data based on a multivariate Gaussian distribution. For example, a first leaf node 811 may cluster first patch data based on a first multivariate Gaussian distribution 821, and a second leaf node 812 may cluster second patch data based on a second multivariate Gaussian distribution 822.

The face tracking apparatus may determine which part of the template shape corresponds to a patch, and may calculate an occlusion probability of the patch based on a probability model designated to the part corresponding to the patch. The face tracking apparatus may use statistics of pixels in a patch as a feature descriptor. The statistics of the pixels in the patch may be, for example, statistics associated with colors. For example, the statistics of the pixels in the patch may include at least one of a color histogram, a color average and a color variance. The face tracking apparatus may calculate an occlusion probability corresponding to a feature descriptor of a patch based on a probability model for the patch. An occlusion probability of an i-th patch $P_i$ may be denoted, for example, by $O(P_i)$.

A probability model may be generated and updated based on unoccluded patches and accordingly, may be used to describe how an unoccluded patch looks like. For example, an occlusion probability of a patch on a cheek may be calculated when a color is used as a feature descriptor to generate a probability model. In this example, in the probability model, a high probability that an arbitrary patch that locates on the cheek and fits a skin color corresponds to an unoccluded part of a face, may be predicted. In other words, a low occlusion probability of the arbitrary patch may be predicted. In practice, because an appearance may change due to a pose, an illumination, or an expression, a proper probability model and feature descriptor may need to be selected.

In an example, when a Gaussian mixture model is used, a probability that a vector x comes from an unoccluded patch may be calculated as shown in Equation 6 below. The vector x may be the feature descriptor vector.

$$p(x) = \sum_{t=1}^{M} w_t g_t(x | \mu_t, \Sigma_t) \qquad \text{[Equation 6]}$$

In Equation 6, M denotes a component number, and $w_t$ denotes a weight of a t-th component. Additionally, $g_t(x|\mu_t, \Sigma_t)$ denotes a t-th component Gaussian density, and may be represented as shown in Equation 7 below.

$$g_t(x | \mu_t, \Sigma_t) = \frac{1}{(2\pi)^{D/2}|\Sigma_t|^{1/2}} \exp\left(-\frac{1}{2}(x-\mu_t)'\Sigma^{-1}(x-\mu_t)\right) \qquad \text{[Equation 7]}$$

In Equation 7, $\mu_t$ denotes an average vector, $\Sigma_t$ denotes a covariance matrix, and D denotes a dimension of the vector x.

In another example, when random trees-based Gaussian models are used, a probability that a vector x comes from an unoccluded patch may be an average of all tree densities. In this example, the probability may be calculated as shown in Equation 8 below.

$$p(x) = \frac{1}{T}\sum_{t=1}^{T} p_t(x)$$ [Equation 8]

In Equation 8, T denotes a tree number, and $p_t(x)$ denotes a t-th tree density and may be calculated as shown in Equation 9 below.

$$p_t(x) = \frac{\pi_{l(x)}}{Z_t} g(x \mid \mu_{l(x)}, \Sigma_{l(x)})$$ [Equation 9]

In Equation 9, $l(x)$ denotes a leaf node into which the vector x is divided, $\pi_{l(x)}$ denotes a proportion of all training samples that reach the leaf node $l(x)$, and $Z_t$ denotes a coefficient for probability normalization. Additionally, $g(x|\mu l(x), \Sigma_{l(x)})$ denotes a single Gaussian model for the leaf node $l(x)$, and may be calculated as shown in Equation 10 below.

$$g_t(x \mid \mu_{l(x)}, \Sigma_{l(x)}) = \frac{1}{(2\pi)^{D/2} |\Sigma_{l(x)}|^{1/2}} \exp\left(-\frac{1}{2}(x - \mu_{l(x)})' \Sigma_{l(x)}^{-1} (x - \mu_{l(x)})\right)$$ [Equation 10]

In Equation 10, $\mu_{l(x)}$ denotes an average vector of all training samples in the leaf node $l(x)$, $\Sigma_{l(x)}$ denotes a covariance matrix of all training samples in the leaf node $l(x)$, and D denotes a dimension of the vector x.

The feature descriptor vector x may be extracted from a patch, neighboring patches of the patch, or neighboring pixels of the patch. For example, a color histogram of pixels in a patch may be extracted as the feature descriptor vector x.

The feature descriptor vector x may include all vectors that may be used to describe properties of a region. For example, the feature descriptor vector x may include, but not limited to, a gradient histogram of pixels in a patch, a color histogram of pixels in a neighboring region of a patch, a gradient histogram of pixels in a neighboring region of a patch, a geometry feature, a texture feature, feature vectors transformed by normalization or a principle component analysis (PCA), and the like. The geometry feature may include, for example, a height-width ratio of a bounding rectangle, a perimeter-area ratio, a major-minor axis length ratio of an ellipse that has the same normalized second central moments as a patch, a proportion of pixels in a convex hull of a patch, and the like. The texture feature may include, for example, a histogram of a local binary feature, elements in a co-occurrence matrix, and the like.

An arbitrary patch may correspond to a plurality of probability models. For example, a template shape may have a range of 100×100 pixels, and may be segmented into 100 parts. In this example, a probability model designated for each of the 100 parts may correspond to a range of 10×10 pixels. When a size of the i-th patch $P_i$ is greater than the range of 10×10 pixels, the i-th patch $P_i$ may correspond to a plurality of parts in the template shape. The face tracking apparatus may acquire a plurality of probability models designated for the plurality of parts. All the probability models may correspond to the i-th patch $P_i$. The face tracking apparatus may calculate an occlusion probability corresponding to a feature descriptor of a patch based on a plurality of probability models for the patch. For example, when an m-th probability model corresponding to the i-th patch $P_i$ is used, an occlusion probability of the i-th patch $P_i$ may be denoted by $O_m(P_i)$. In this example, the occlusion probability $O(P_i)$ may be calculated to be equal to "$\min(O_m(P_i))$."

An occlusion probability of a patch may be predicted based on corresponding probability models. Because a number of patches is not constant in practice, a one-to-one corresponding relationship between probability models and patches may not be established.

For example, when $N_i$ probability models exist in an area of a patch i, $N_i$ occlusion probabilities $p_j(x_i)$, $j=1, \ldots, N_i$ may be calculated. In $p_j(x_i)$, $j=1, \ldots, N_i$, $x_i$ denotes a feature descriptor of the patch i.

An occlusion probability of a patch may be a fusion result of all occlusion probabilities $p_j(x_i)$. For example, when the patch i is not occluded, the $N_i$ probability models may all describe an appearance of a face area around the patch i. However, a portion of the $N_i$ probability models may describe an appearance of neighboring patches. Thus, a reliability of occlusion probabilities $p_j(x_i)$ may be changed.

As an example of a probability fusion, a hypothesis that low occlusion probability scores are more reliable than high occlusion probability scores may be used. A low occlusion probability score may indicate that an observed appearance is completely matched to a model. A high occlusion probability score may be caused by multiple reasons, for example, insufficient training or adaptation, a probability model that is closer to another patch rather than the patch i, an unseen appearance due to a change in illumination, and the like. Accordingly, a lowest occlusion probability may be determined as an occlusion probability of the patch i.

As another example of the probability fusion, a distance between a location that a probability model is defined and a centroid of a patch may be used. For example, a probability that an arbitrary patch is not occluded may be calculated as shown in Equation 11 below.

$$p_i = \sum_{j=1}^{N_i} w_j p_j(x_i)$$ [Equation 11]

In Equation 11, $p_i$ denotes a probability that the patch i is not occluded. Additionally, $w_j$ denotes a weight coefficient, and may be calculated as shown in Equation 12 below.

$$w_j = \frac{\exp\left(-\frac{d_j}{\max_j d_j}\right)}{\sum_{j=1}^{N_i} \exp\left(-\frac{d_j}{\max_j d_j}\right)}$$ [Equation 12]

In Equation 12, $d_j$ denotes a distance between a location that a probability model j is defined and a centroid of a patch.

Figure 9A:
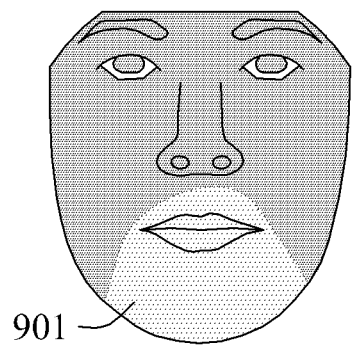
FIGS. 9A through 9C illustrate examples of an occlusion probability according to example embodiments.
Figure 9B:
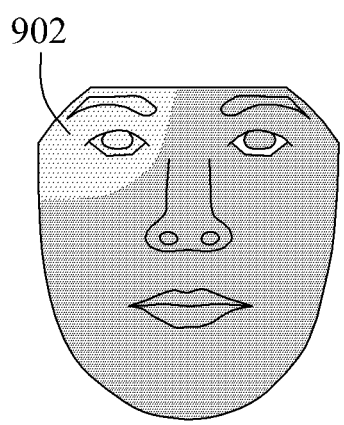
Figure 9C:
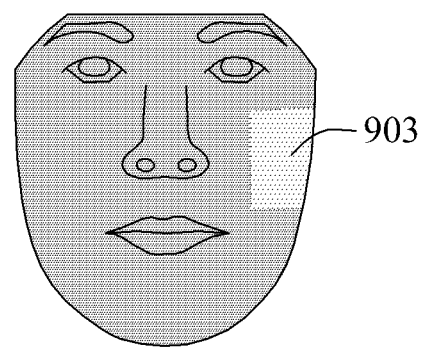

In operation 132, the face tracking apparatus may calculate occlusion probabilities of the sections. The face tracking apparatus may estimate probabilities that each of the main components of the face is occluded, by calculating the occlusion probabilities of the sections. For example, referring to FIG. 9A, an occlusion probability of a section 901 corresponding to a mouth may be calculated to be higher than occlusion probabilities of the other sections. In this example, the face tracking apparatus may determine that the mouth is highly likely to be occluded in an input image. Referring to FIG. 9B, an occlusion probability of a section 902 corresponding to a right eye may be calculated to be higher than occlusion probabilities of the other sections. The face tracking apparatus may determine that the right eye is highly likely to be occluded in an input image. Referring to FIG. 9C, an occlusion probability of a section 903 corresponding to a portion of a left cheek may be calculated to be higher than occlusion probabilities of the other sections. The face tracking apparatus may determine that the portion of the left cheek is highly likely to be occluded in an input image.

The face tracking apparatus may calculate an occlusion probability of each of the sections, based on an adaptive Gaussian model corresponding to each of the sections. The adaptive Gaussian model may reflect the main components of the face, for example, eyes, a nose, a mouth, eyebrows, and the like. The face tracking apparatus may use, as a feature descriptor, a number of valid matching results included in a section. For example, the face tracking apparatus may count valid matching results included in a section, based on a valid matching result that is stored in advance during detection of the face region. The face tracking apparatus may calculate an occlusion probability corresponding to a feature descriptor of a section, based on a probability model of the section. An occlusion probability of a j-th section $R_j$ may be denoted by $O(R_j)$.

In operation 133, the face tracking apparatus may generate an occlusion weight map. The occlusion weight map may include an occlusion probability of each of pixels included in the face region. For example, the face tracking apparatus may generate an occlusion weight map, based on the occlusion probabilities of the patches, and the occlusion probabilities of the sections. In this example, accuracy of the patches may differ from accuracy of the sections. The face tracking apparatus may estimate an occlusion probability of each of pixels, based on both the occlusion probabilities of the patches, and the occlusion probabilities of the sections.

For example, the face tracking apparatus may generate an occlusion weight map, using an equation $O(X_k)=\max(O(P_i), O(R_j))$. In the equation, $O(X_k)$ denotes an occlusion weight of a k-th pixel in a face region, $O(P_i)$ denotes an occlusion probability of the i-th patch $P_i$ to which the k-th pixel belongs, and $O(R_j)$ denotes an occlusion probability of the j-th section $R_j$ to which the k-th pixel belongs. A scheme of generating an occlusion weight map by combining the occlusion probabilities of the patches and the occlusion probabilities of the sections may be variously modified.

Figure 10:
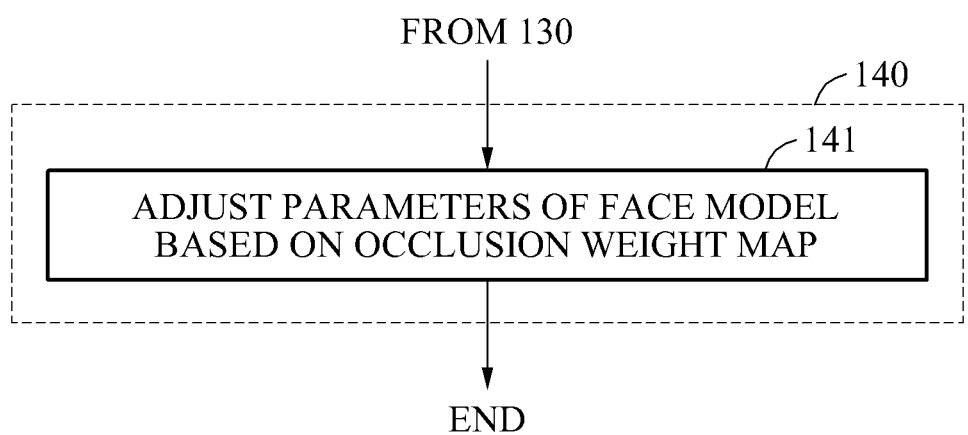
FIG. 10 is a flowchart illustrating an operation of adjusting parameters of a face model in the face tracking method of FIG. 1.

In operation 140, the face tracking apparatus may track the face based on the occlusion probabilities. Referring to FIG. 10, in operation 141, the face tracking apparatus may adjust parameters of a face model, based on the occlusion weight map. The face model may include, for example, a 2D shape model, a 3D shape model, and/or a texture model. The face model may be, for example, a deformable shape model.

The face tracking apparatus may adapt a deformable shape model to an input face, by adjusting predetermined parameters of the deformable shape model. The input face may refer to a face included in the current frame. The face tracking apparatus may adjust parameters of the deformable shape model so that an output of a cost function defined using the occlusion weight map may be minimized. According to example embodiments, it is possible to reduce an error occurring in an occluded region, by using the occlusion weight map. Additionally, it is possible to prevent feature points in an occluded region from deviating far from typical positions, by using deformation energy of the deformable shape model.

The cost function may be used to calculate a matching error between the face model and the input face, based on the occlusion weight map. Hereinafter, the output of the cost function may be referred to as "matching error information." To minimize the matching error information, the face tracking apparatus may change at least one of a 2D shape parameter, a 2D similarity transformation parameter, a 3D shape parameter, a 3D similarity transformation parameter and a texture parameter.

In an example, the cost function may be defined as shown in Equation 13 below.

$$E(p,q,b)=|(1-O_a)\cdot(a(b)-A(p,q))|^2 \qquad \text{[Equation 13]}$$

In Equation 13, E(p, q, b) denotes a cost function, and $O_a$ denotes an occlusion probability. A(p, q) denotes a texture vector acquired from a current frame, and a(b) denotes a texture vector corresponding to a texture model. When an occlusion probability of a pixel increases, a weight applied to a difference between the texture vectors A(p, q) and a(b) may decrease. Accordingly, an influence caused by occlusion may be reduced due to an increase in the occlusion probability of the pixel.

The texture vector A(p, q) may be calculated based on a 2D shape parameter p and a 2D similarity transformation parameter q. The face tracking apparatus may allow feature points included in a 2D shape model to be included in an image I with a predetermined size. The 2D shape model may be represented by the 2D shape parameter p and the 2D similarity transformation parameter q. For example, the face tracking apparatus may set the 2D shape parameter p to "0", set the 2D similarity transformation parameter q to an appropriate value, and may allow the feature points in the 2D shape model to be included in the image I.

The face tracking apparatus may set triangles in which the feature points in the 2D shape model are used as vertices. The triangles may be set to be adjacent to each other and not to overlap each other, based on a common edge or a common vertex. Each of the triangles may be set by a pixel $X_k$ of the image I, and k denotes an index.

The face tracking apparatus may calculate coordinates of an orthocenter of a triangle corresponding to the pixel $X_k$ of the image I. The face tracking apparatus may calculate coordinates of a corresponding point corresponding to the pixel $X_k$, based on coordinates of each of a vertex and an orthocenter of a triangle corresponding to the pixel $X_k$. The coordinates of the corresponding point may indicate a pixel in the current frame. For example, the face tracking apparatus may calculate coordinates of a corresponding point corresponding to the pixel $X_k$, using a nearest neighbor method and/or a linear interpolation method.

The face tracking apparatus may acquire a color from the pixel in the current frame indicated by the coordinates of the corresponding point. The face tracking apparatus may change the image I to a texture image I', by assigning the acquired color to the pixel $X_k$. The texture image I' may be irrelevant to a shape of the face in the current frame.

The face tracking apparatus may change pixels of the texture image I'. For example, the face tracking apparatus may acquire the texture vector A(p, q) by combining, in a single vector, a result obtained by applying a grayscale normalization to the texture image I' and/or a result obtained by applying a gradient transform to the texture image I'.

The face tracking apparatus may calculate the 2D shape parameter p, the 2D similarity transformation parameter q, and a texture parameter b, to minimize the cost function E(p, q, b). For example, the face tracking apparatus may minimize the cost function E(p, q, b), by changing the 2D shape parameter p, the 2D similarity transformation parameter q, and the texture parameter b, using a gradient descent algorithm. The face tracking apparatus may acquire the feature points of the face from the current frame, by applying the calculated 2D shape parameter p and the calculated 2D similarity transformation parameter q to Equation 1.

In another example, the cost function may be defined based on a bias between a 2D shape model and a 2D projection of a 3D shape model, as shown in Equation 14 below.

$$|s(p,q)-\text{Proj}(s'(p',q'))|^2 \quad\quad \text{[Equation 14]}$$

In Equation 14, s(p, q) denotes a 2D shape model, and Proj(s'(p', q')) denotes a 2D projection of a 3D shape model. The face tracking apparatus may calculate a 2D shape parameter p, a 2D similarity transformation parameter q, a 3D shape parameter p', and a 3D similarity transformation parameter q' that may minimize an output of the cost function defined as shown in Equation 14. In an example, the face tracking apparatus may acquire the feature points of the face from the current frame, by applying the calculated 2D shape parameter p and the calculated 2D similarity transformation parameter q to Equation 1. In another example, the face tracking apparatus may acquire the feature points of the face from the current frame, by applying the calculated 3D shape parameter p' and the calculated 3D similarity transformation parameter q' to Equation 2.

The face tracking apparatus may output a tracking result corresponding to each of images or each of frames. The tracking result may be expressed in various ways.

In an example, the tracking result may be expressed based on the above-described face model. The tracking result may be expressed as a 2D shape model including 2D coordinates of feature points of a face, as a 3D shape model including 3D coordinates of the feature points of the face, or as a texture model including texture information of the face.

In another example, the tracking result may be expressed using parameters of the face model. The tracking result may be expressed using a 2D shape parameter and a 2D similarity transformation parameter of a 2D shape model, using a 3D shape parameter and a 3D similarity transformation parameter of a 3D shape model, or using a texture parameter of a texture model.

In still another example, the tracking result may be expressed based on pose information and expression information of a face. The pose information may represent a pose of the face, and may include, for example, a frontal pose, a side pose, and the like of the face. The expression information may represent a facial expression, and may include, for example, a smiling expression, a crying expression, and the like.

The above-described schemes of expressing the tracking result are merely examples and accordingly, may be variously changed. For example, the tracking result may be expressed using various combinations of the above schemes.

Figure 11:
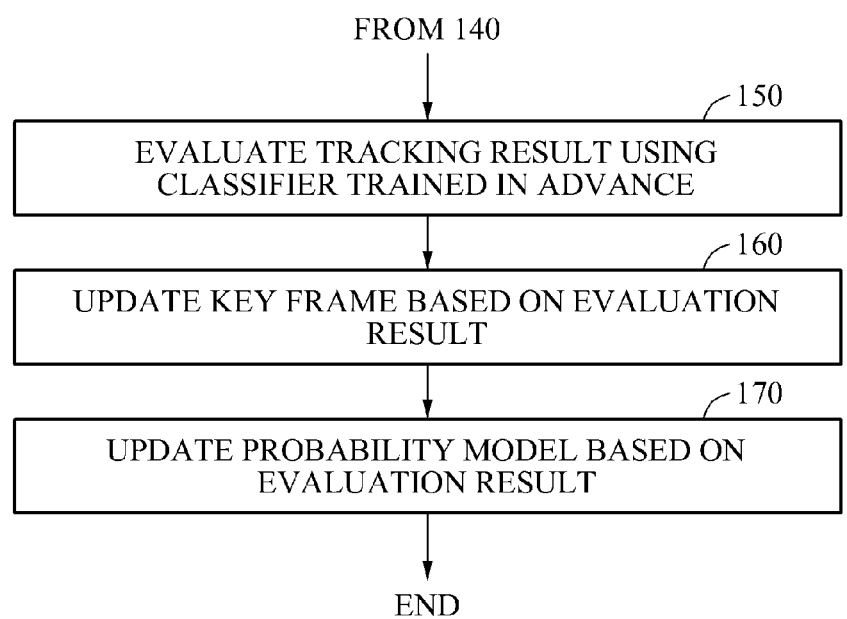
FIG. 11 is a flowchart illustrating a post-process of the face tracking method of FIG. 1.

The face tracking apparatus may evaluate the tracking result, and may update a key frame or a probability model. Referring to FIG. 11, in operation 150, the face tracking apparatus may evaluate the tracking result, using a classifier that is trained in advance. The face tracking apparatus may determine whether a tracking result obtained from the current frame is reliable, by evaluating the tracking result. In an example, when the tracking result is evaluated as success, the tracking result obtained from the current frame may be used to track a face from a next frame. In this example, a key frame and/or a probability model may be updated. In another example, when the tracking result is evaluated as failure, the tracking result obtained from the current frame may not be used to track a face from the next frame. In this example, a key frame and/or a probability model may not be updated.

The classifier used to evaluate the tracking result may be trained in advance, based on training samples. The training samples may include a plurality of images or streaming video, and positions of feature points included in each image or each frame may be labeled.

The classifier may be, for example, a random tree classifier configured to classify a tracking result into success and failure. The classifier may be, for example, one of a support vector machine (SVM) and a random forest. The classifier may classify successfully tracked samples as positive samples, and may classify unsuccessfully tracked samples as negative samples. Information input to the classifier may include, for example, at least one of various parameters included in the tracking result, and outputs of a cost function.

To increase a number of negative samples to train the classifier, a disturbance may be added to the training samples. For example, noise or occlusion may occur in the training samples, or a brightness or contrast may be changed.

When the tracking result is evaluated as success, the face tracking apparatus may update a key frame in operation 160. For example, the face tracking apparatus may acquire, from the tracking result, 3D coordinates of feature points, a pose parameter, and an expression parameter. The face tracking apparatus may add, to the database, a key frame indexed by the pose parameter and the expression parameter. The key frame may include the 3D coordinates of the feature points. When the key frame indexed by the pose parameter and the expression parameter is stored in advance in the database, whether the key frame is replaced by another key frame may be determined based on a score evaluated by the classifier. For example, when a newly generated key frame has a higher score by the classifier than the key frame stored in advance, the key frame stored in advance may be replaced by the newly generated key frame.

When the tracking result is evaluated as success, the face tracking apparatus may update a probability model in operation 170. The face tracking apparatus may update probability models used to calculate occlusion probabilities of patches, and/or probability models used to calculate occlusion probabilities of sections. For example, the face tracking apparatus may use a node split to update the probability models used to calculate the occlusion probabilities of the patches.

As described above with reference to FIG. 8, a probability model used to calculate occlusion probabilities of patches may have a tree structure. When a quantity of data included in a leaf node is equal to or greater than a first threshold, when an information gain through the node split is equal to or greater than a second threshold, and when a depth of a tree is less than a third threshold, the face tracking apparatus may update the probability model by splitting the leaf node.

Figure 12:
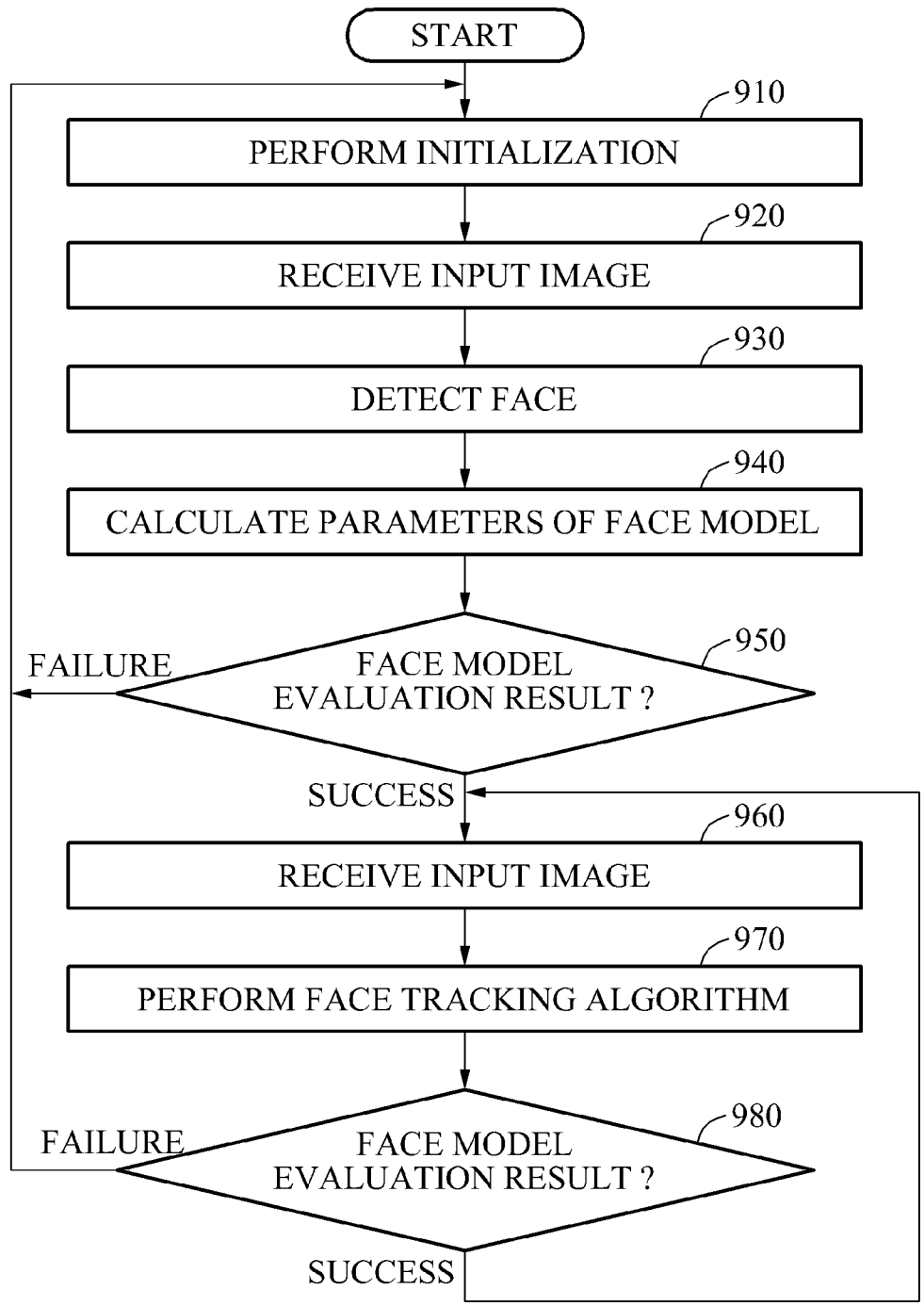
FIG. 12 is a flowchart illustrating a whole face tracking process according to example embodiments.

FIG. 12 is a flowchart illustrating a whole face tracking process according to example embodiments. Referring to FIG. 12, in operation 910, a face tracking apparatus according to example embodiments may perform initialization. For example, probability models may be initialized. In operation 920, the face tracking apparatus may receive an input image. In operation 930, the face tracking apparatus may detect a face. For example, a face region may be detected using a typical face detection algorithm. In operation 940, the face tracking apparatus may calculate parameters of a face model.

In operation 950, the face tracking apparatus may determine whether a face model evaluation result is success. For example, a classifier trained in advance may be used to evaluate the face model. When the face model evaluation result is determined as failure, the face tracking apparatus may track a face of a next frame in the input image through operations 910 to 950.

When the face model evaluation result is determined as success, the face tracking apparatus may track the face of the next frame through operations 960 to 980. In operation 960, the face tracking apparatus may receive the next frame. In operation 970, the face tracking apparatus may perform a face tracking algorithm. The face tracking algorithm will be further described with reference to FIG. 13 below. The face tracking apparatus may receive the face model evaluation result, by performing the face tracking algorithm. In operation 980, the face tracking apparatus may determine whether the face model evaluation result is success. When the face model evaluation result is determined as failure, the face tracking apparatus may track a face of a frame next to the next frame through operations operation 910 to 950. When the face model evaluation result is determined as success, the face tracking apparatus may track the face of the frame next to the next frame through operations 960 to 980.

Figure 13:
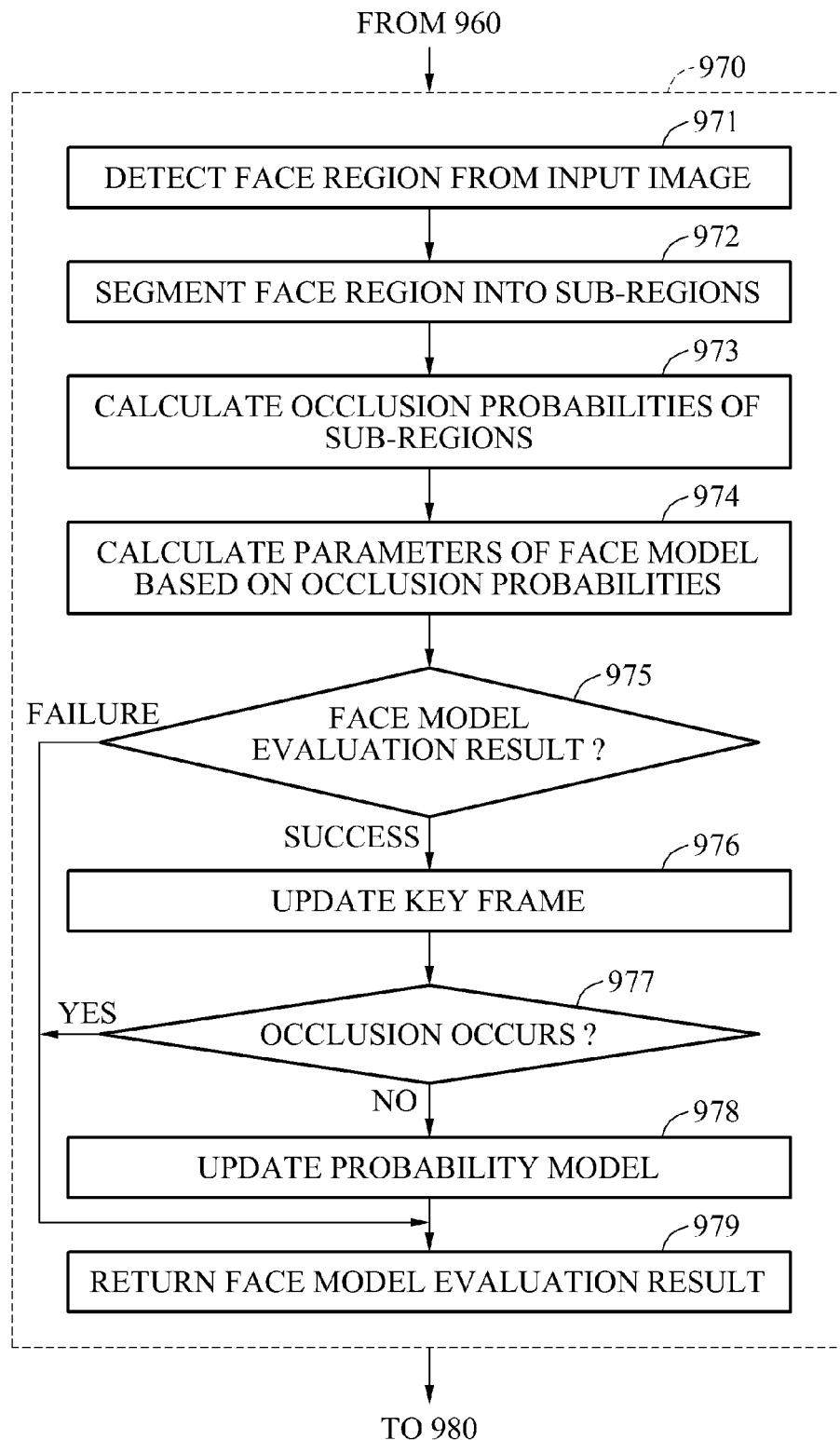
FIG. 13 is a flowchart illustrating an operation of performing a face tracking algorithm in the face tracking process of FIG. 12.

FIG. 13 is a flowchart illustrating operation 970 of FIG. 12. The above-description of FIGS. 1 through 11 is also applicable to operations 971 to 979 of FIG. 13. For example, operations 971 to 976 may correspond to operations 110 to 160 described above with reference to FIGS. 1 and 11, respectively.

In operation 977, the face tracking apparatus may determine whether occlusion occurs in the input image. The face tracking apparatus may determine whether occlusion occurs in the input image, based on occlusion probabilities of sub-regions. For example, when occlusion probabilities of all patches and occlusion probabilities of all sections are less than a predetermined threshold, the face tracking apparatus may determine that the occlusion does not occur in the input image.

When the occlusion is determined not to occur in the input image, the face tracking apparatus may update a probability model in operation 978. Operation 978 may correspond to operation 170 of FIG. 11. When the occlusion is determined to occur in the input image, the face tracking apparatus may not update the probability model. In operation 979, the face tracking apparatus may return a face model evaluation result.

Figure 14:
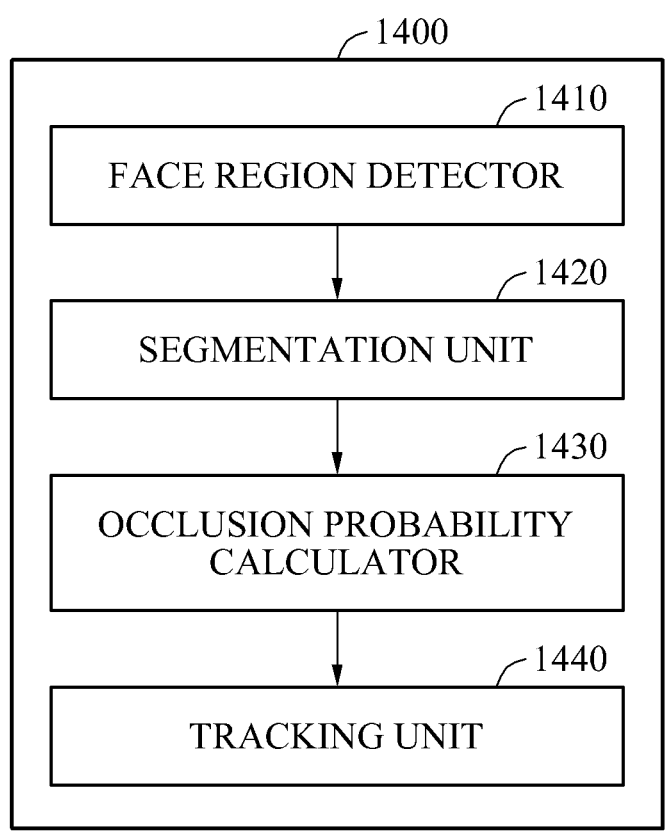
FIG. 14 is a block diagram illustrating a face tracking apparatus according to example embodiments.
Figure 15:
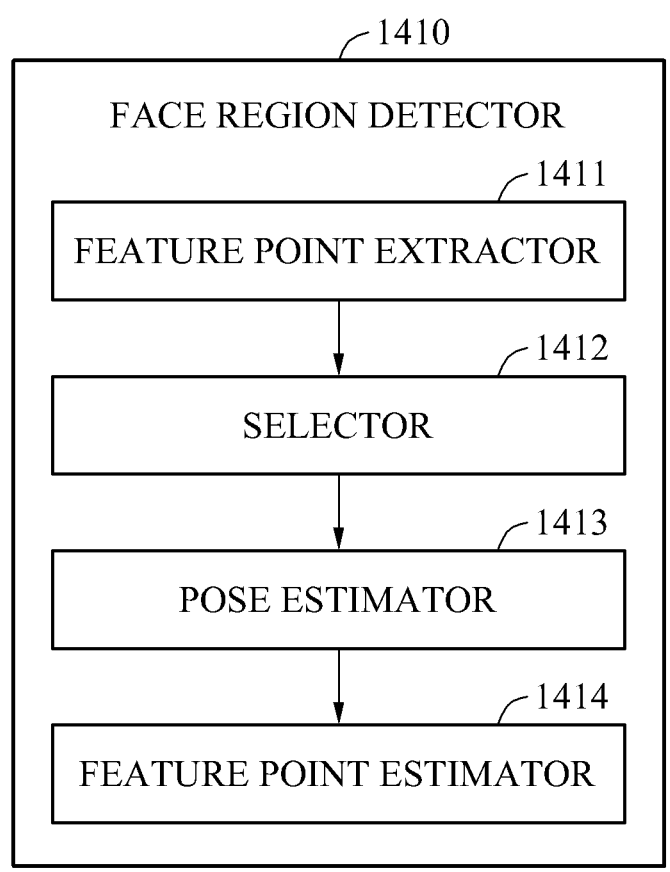
FIG. 15 is a block diagram illustrating a face region detector in the face tracking apparatus of FIG. 14.

FIG. 14 is a block diagram illustrating a face tracking apparatus 1400 according to example embodiments. Referring to FIG. 14, the face tracking apparatus 1400 includes a face region detector 1410, a segmentation unit 1420, an occlusion probability calculator 1430, and a tracking unit 1440. The face region detector 1410 may detect a face region from an input image. The segmentation unit 1420 may segment the face region into sub-regions. The occlusion probability calculator 1430 may calculate occlusion probabilities of the sub-regions. The tracking unit 1440 may track a face included in the input image based on the occlusion probabilities. In the input image, at least a portion of the face may be occluded. Referring to FIG. 15, the face region detector 1410 includes a feature point extractor 1411, a selector 1412, a pose estimator 1413, and a feature point estimator 1414. The feature point extractor 1411 may extract first feature points from a current frame of the input image. The selector 1412 may select at least one key frame from a database. The pose estimator 1413 may estimate a pose of the face in the input image, based on the first feature points and second feature points of the at least one key frame. The feature point estimator 1414 may estimate third feature points of the face in the input image, based on the estimated pose.

Figure 16:
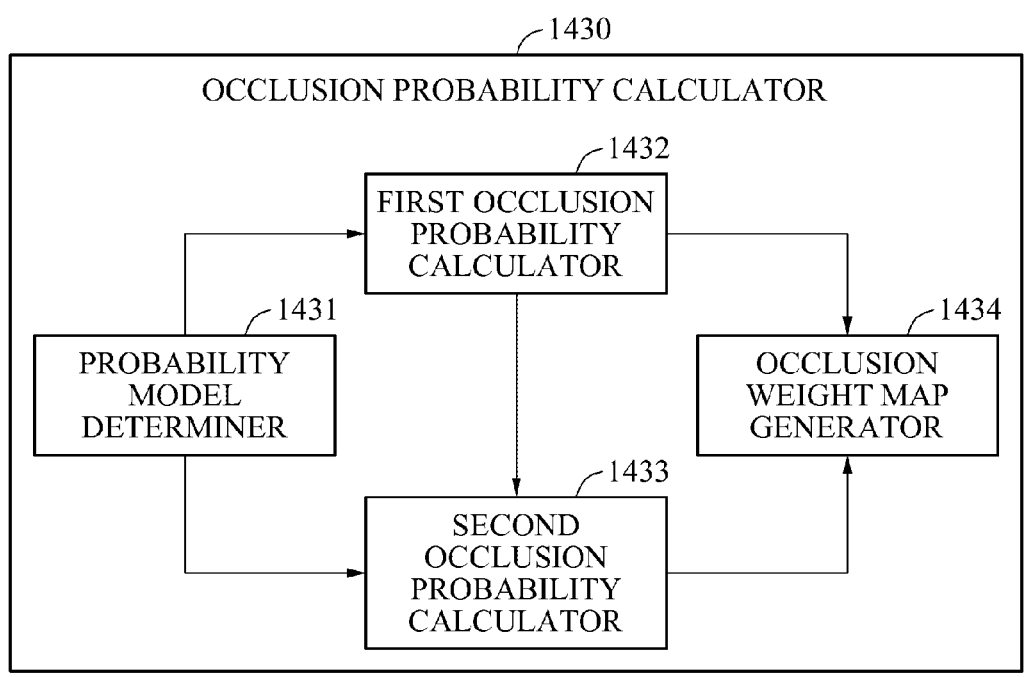
FIG. 16 is a block diagram illustrating an occlusion probability calculator in the face tracking apparatus of FIG. 14.

Referring to FIG. 16, the occlusion probability calculator 1430 includes a probability model determiner 1431, a first occlusion probability calculator 1432, a second occlusion probability calculator 1433, and an occlusion weight map generator 1434. The probability model determiner 1431 may determine first probability models of patches, and second probability models of sections. The first occlusion probability calculator 1432 may calculate first occlusion probabilities of the patches based on the first probability models. The second occlusion probability calculator 1433 may calculate second occlusion probabilities of the sections based on the second probability models. The occlusion weight map generator 1434 may generate an occlusion weight map, based on the first occlusion probabilities and the second occlusion probabilities.

The above-description of FIGS. 1 through 13 is also applicable to examples of FIGS. 14 through 16 and accordingly, will not be repeated here.

The units described herein may be implemented using hardware components, software components, or a combination thereof. For example, a processing device may be implemented using one or more special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A face tracking method, comprising:
   detecting a face region based on an input image;
   segmenting the face region into a plurality of sub-regions;
   calculating occlusion probabilities for the plurality of sub-regions, the occlusion probabilities for the plurality of sub-regions calculated based on probability models for a plurality of parts of a template face shape, the plurality of parts of the template face shape corresponding to the plurality of sub-regions; and
   tracking a face included in the input image based on the occlusion probabilities.

2. The face tracking method of claim 1, wherein at least a portion of the face in the input image is occluded.

3. The face tracking method of claim 1, wherein the detecting detects the face region in the input image based on a previous tracking result.

4. The face tracking method of claim 1, wherein the detecting comprises:
   extracting a plurality of first feature points from a current frame of the input image;
   selecting at least one key frame from a database;
   estimating a pose of the face based on the plurality of first feature points and a plurality of second feature points of the at least one key frame; and
   estimating a plurality of third feature points of the face based on the estimated pose.

5. The face tracking method of claim 4, wherein the at least one key frame is indexed by a pose parameter and an expression parameter.

6. The face tracking method of claim 4, wherein the selecting selects the at least one key frame based on a pose parameter and an expression parameter of a previous frame of the input image.

7. The face tracking method of claim 4, wherein the at least one key frame includes three-dimensional (3D) coordinates of previously matched feature points, and feature vectors of the previously matched feature points.

8. The face tracking method of claim 4, wherein the estimating the pose comprises:
   generating matching relationship information associated with a matching relationship between the plurality of first feature points and the plurality of second feature points based on similarity between feature vectors of the plurality of first feature points and feature vectors of the plurality of second feature points; and
   estimating a pose parameter based on a distance between coordinates of a first feature point and projected coordinates of a second feature point matched to the first feature point, the pose parameter indicating the pose of the face.

9. The face tracking method of claim 8, wherein the detecting further comprises generating a valid matching result based on the distance.

10. The face tracking method of claim 1, wherein the segmenting comprises:
    generating a plurality of patches based on positions and colors of pixels included in the face region; and
    generating a plurality of sections based on a plurality of feature points estimated from the face region.

11. The face tracking method of claim 10, wherein the generating the plurality of sections comprises:
    merging patches, from among the plurality of patches, that are adjacent to each of the estimated feature points; and
    generating the plurality of sections.

12. The face tracking method of claim 1, wherein
    the occlusion probabilities include first occlusion probabilities for a plurality of patches and second occlusion probabilities for a plurality of sections;
    the probability models include first probability models for the plurality of patches and second probability models for the plurality of sections; and
    the calculating includes
      calculating the first occlusion probabilities for the plurality of patches based on the first probability models for the plurality of patches,
      calculating the second occlusion probabilities for the plurality of sections based on the second probability models for the plurality of sections, and
      generating an occlusion weight map based on the first occlusion probabilities and the second occlusion probabilities.

13. The face tracking method of claim 12, wherein the first probability models are designated for parts of the template face shape that correspond to patches among the plurality of parts of the template face shape.

14. The face tracking method of claim 12, wherein a feature descriptor of the plurality of patches includes a feature associated with colors of pixels included in the plurality of patches.

15. The face tracking method of claim 12, wherein the second probability models are associated with components corresponding to sections, from among the plurality of sections, that correspond to main components of the face.

16. The face tracking method of claim 12, wherein a feature descriptor of the plurality of sections includes a feature associated with a number of valid matching results included in the plurality of sections.

17. The face tracking method of claim 12, wherein the occlusion weight map includes an occlusion probability for each pixel in the face region.

18. The face tracking method of claim 1, wherein the tracking comprises:
adjusting a parameter of a face model representing the face based on an occlusion weight map.

19. The face tracking method of claim 18, wherein the face model includes at least one of a two-dimensional (2D) shape model, a 3D shape model and a texture model.

20. The face tracking method of claim 18, wherein the adjusting adjusts the parameter of the face model to minimize a cost function defined based on the occlusion weight map.

21. The face tracking method of claim 1, further comprising:
evaluating a tracking result using a trained classifier; and
updating a key frame when the tracking result is evaluated as successful.

22. The face tracking method of claim 21, further comprising:
determining whether occlusion occurs in the input image when the tracking result is evaluated as successful; and
updating a probability model, among the probability models, when the occlusion is determined not to occur.

23. A non-transitory computer readable recording medium storing a program that, when executed on a computer, causes the computer to implement the method of claim 1.

24. A face tracking apparatus, comprising:
at least one processor configured to executed computer-readable instructions to
detect a face region based on an input image;
segment the face region into a plurality of sub-regions;
calculate occlusion probabilities for the plurality of sub-regions, the occlusion probabilities for the plurality of sub-regions calculated based on probability models for a plurality of parts of a template face shape, the plurality of parts of the template face shape corresponding to the plurality of sub-regions; and
track a face included in the input image based on the occlusion probabilities.

25. The face tracking apparatus of claim 24, wherein at least a portion of the face in the input image is occluded.

26. The face tracking apparatus of claim 24, wherein the at least one processor is further configured to execute the computer-readable instructions to
extract a plurality of first feature points from a current frame of the input image;
select at least one key frame from a database;
estimate a pose of the face based on the plurality of first feature points and a plurality of second feature points of the at least one key frame; and
estimate a plurality of third feature points of the face based on the estimated pose.

27. The face tracking apparatus of claim 26, wherein:
the at least one key frame includes information associated with the plurality of second feature points; and
the at least key frame is indexed by a pose parameter and an expression parameter.

28. The face tracking apparatus of claim 24, wherein the at least one processor is further configured to execute the computer-readable instructions to:
generate a plurality of patches based on positions and colors of pixels in the face region; and
generate a plurality of sections based on a plurality of feature points estimated from the face region.

29. The face tracking apparatus of claim 28, wherein the at least one processor is further configured to execute the computer-readable instructions to
merge patches, from among the plurality of patches, that are adjacent to each of the plurality of estimated feature points; and
generate the plurality of sections.

30. The face tracking apparatus of claim 24, wherein
the occlusion probabilities include first occlusion probabilities for a plurality of patches and second occlusion probabilities for a plurality of sections;
the probability models include first probability models for the plurality of patches and second probability models for the plurality of sections; and
the at least one processor is further configured to execute the computer-readable instructions to
determine the first probability models for the plurality of patches,
determine the second probability models for the plurality of sections;
calculate the first occlusion probabilities for the plurality of patches based on the first probability models;
calculate the second occlusion probabilities for the plurality of sections based on the second probability models; and
generate an occlusion weight map based on the first occlusion probabilities and the second occlusion probabilities.

* * * * *